US011119551B2

United States Patent
Xu et al.

(10) Patent No.: US 11,119,551 B2
(45) Date of Patent: Sep. 14, 2021

(54) POWER CONSUMPTION SENSING FOR POWER OVER ETHERNET (POE) POWER SOURCING EQUIPMENT (PSE) SYSTEM

(71) Applicant: TEXAS INSTRUMENTS INCORPORATED, Dallas, TX (US)

(72) Inventors: Pu Xu, Allen, TX (US); Matthew Thomas Murdock, Hollis, NH (US); Chandrashekar Ishwaramangala Ganesh Rao, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 81 days.

(21) Appl. No.: 16/233,433

(22) Filed: Dec. 27, 2018

(65) Prior Publication Data

US 2020/0044874 A1 Feb. 6, 2020

Related U.S. Application Data

(60) Provisional application No. 62/713,748, filed on Aug. 2, 2018.

(51) Int. Cl.
| | |
|---|---|
| *G06F 1/26* | (2006.01) |
| *G06F 1/28* | (2006.01) |
| *G06F 1/32* | (2019.01) |
| *H04L 12/10* | (2006.01) |
| *H04L 12/40* | (2006.01) |

(52) U.S. Cl.
CPC .............. *G06F 1/266* (2013.01); *G06F 1/28* (2013.01); *H04L 12/10* (2013.01); *H04L 12/40045* (2013.01)

(58) Field of Classification Search
CPC .......... G06F 1/266; G06F 1/28; G06F 1/3209; G06F 1/3296; H04L 12/10; H04L 12/40045
See application file for complete search history.

(56) References Cited

U.S. PATENT DOCUMENTS

| | | | | |
|---|---|---|---|---|
| 2006/0133368 A1* | 6/2006 | Tolliver | ................... | H04L 12/44 370/389 |
| 2006/0149978 A1* | 7/2006 | Randall | ................. | G06F 1/3215 713/300 |
| 2006/0168459 A1* | 7/2006 | Dwelley | ................. | H04L 12/10 713/300 |
| 2007/0121929 A1* | 5/2007 | Korcharz | ................ | H04L 12/10 379/413 |
| 2008/0114998 A1* | 5/2008 | Ferentz | .................... | H04L 12/12 713/324 |

(Continued)

*Primary Examiner* — Stefan Stoynov
(74) *Attorney, Agent, or Firm* — Ray A. King; Charles A. Brill; Frank D. Cimino (57) ABSTRACT

A system includes a power sourcing equipment (PSE) unit. The PSE unit includes a plurality of network ports. The PSE unit also includes a PSE board coupled to the plurality of network ports and configured to provide power to a plurality of powered devices (PDs) external to the PSE unit via respective network ports. The PSE unit also includes a sensing circuit configured to determine a power consumption parameter for the PSE board. The PSE unit also includes a controller configured to change a power state for at least one of the plurality of network ports based at least in part on the power consumption parameter.

15 Claims, 6 Drawing Sheets

(56) References Cited

U.S. PATENT DOCUMENTS

| | | | |
|---|---|---|---|
| 2009/0055672 A1* | 2/2009 | Burkland | H04L 12/10 713/340 |
| 2010/0007334 A1* | 1/2010 | Apfel | H04L 12/10 324/123 R |
| 2015/0355701 A1* | 12/2015 | Huang | G06F 1/266 711/103 |
| 2016/0055354 A1* | 2/2016 | Jinaraj | G06F 21/81 726/36 |

* cited by examiner

POWER CONSUMPTION SENSING FOR POWER OVER ETHERNET (POE) POWER SOURCING EQUIPMENT (PSE) SYSTEM

CROSS-REFERENCE TO RELATED APPLICATIONS

The present application claims priority to U.S. Provisional Patent Application No. 62/713,748, filed Aug. 2, 2018, titled "Method and Apparatus for Measuring Total Power Consumption in Power Over Ethernet (PoE) Power Sourcing Equipment (PSE) System," which is hereby incorporated herein by reference in its entirety.

BACKGROUND

The proliferation of networked devices continues along with efforts to improve efficiency, to miniaturize components, and to reduce the amount of cables needed for power and/or communications. One example technology that reduces the amount of cables involves using the same cable for both power and communications (e.g., Power over Ethernet or "PoE" technology). An example system to combine power and network options is referred to as a Power Sourcing Equipment (PSE) system. In a PSE system, there are usually multiple ports (e.g., 16 ports, 24 ports, 48 ports, 96 ports), and the power supply for the PSE system is not able to supply full power for all ports at the same time.

SUMMARY

In accordance with at least one example of the disclosure, a system comprises a power sourcing equipment (PSE) unit. The PSE unit comprises a plurality of network ports and a PSE board coupled to the plurality of network ports. The PSE board is configured to provide power to a plurality of powered devices (PDs) external to the PSE unit via respective network ports. The PSE unit also comprises a sensing circuit configured to determine a power consumption parameter for the PSE board. The PSE unit also comprises a controller configured to change a power state for at least one of the plurality of network ports based at least in part on the power consumption parameter.

In accordance with at least one example of the disclosure, a PSE system comprises a plurality of network ports and a power over network management circuit for each of the plurality of network ports. The PSE system also comprises a sensing circuit coupled to a power supply line and to each power over network management circuit. The PSE system also comprises a controller coupled to the sensing circuit and to each power over network management circuit. The controller is configured to direct at least one of the power over network management circuits to change a power state for a respective network port based on a power consumption parameter provided to the controller from the sensing circuit.

In accordance with at least one example of the disclosure, a method comprises providing power to a plurality of variable load devices via a plurality of respective Power over Ethernet (PoE) ports. The method also comprises determining, by a sensing circuit, a power consumption parameter associated with all of the PoE ports. The method also comprises using, by a controller, the power consumption parameter to change a power state for at least one of the PoE ports.

BRIEF DESCRIPTION OF THE DRAWINGS

For a detailed description of various examples, reference will now be made to the accompanying drawings in which.

DETAILED DESCRIPTION

Disclosed herein are power consumption monitoring and response systems, circuits, and methods related to power sourcing equipment (PSE) system. As used herein, a "PSE system" is a system or unit that provides power to a plurality of external powered devices (PDs) via respective network cables (e.g., Ethernet cables). An example PSE system is a network switch, and example PDs include security cameras, wireless access points, access control devices, voice-over IP (VOIP) phones, and point-of-sale (POS) terminals. For different PSE system, the number of network ports available to power PDs varies. Also, the power consumption of PDs is dynamic.

In some examples, a PSE system includes a plurality of network ports. The PSE system also includes a PSE board coupled to the plurality of network ports and configured to provide power to a plurality of PDs external to the PSE system via respective network ports. The PSE system also includes a sensing circuit configured to determine a power consumption parameter for the PSE board. The PSE system also includes a controller configured to change a power state for at least one of the plurality of network ports based at least in part on the power consumption parameter.

In different examples, the sensing circuit and/or the power consumption parameter provided by the sensing circuit varies. In some examples, the power consumption parameter provided by the sensing circuit is an analog current value related to all active network ports of the PSE system. In other examples, the power consumption parameter provided by the sensing circuit is a digital current value related to all active network ports of the PSE system. In other examples, the power consumption parameter provided by the sensing circuit is a digital power consumption value related to all active network ports of the PSE system. In other examples, the power consumption parameter provided by the sensing circuit is an over-current alert signal related to all active network ports of the PSE system. In response to receiving a power consumption parameter, the controller for the PSE system performs power state updates (e.g., on-to-off or off-to-on) for at least one of the plurality of network ports. In some examples, the controller uses the power consumption parameter provided by the sensing circuit directly to perform power state updates. In other examples, the controller uses the power consumption parameter to calculate a power consumption for all active network ports of the PSE system. Thereafter, the controller performs power state updates for network ports of the PSE system based on the calculated power consumption.

In some examples, power state updates of the PSE system are based on a PD or network port prioritization scheme. In one example, security devices (e.g., security cameras) powered by a PSE system are assigned a higher priority than non-security devices (e.g., by connecting the security devices to higher priority ports). In some examples, the PSE system is able to detect a PD's requested power, where port priority is used to determine which PDs receive power should there be insufficient power for all PDs requesting power at a given time.

In some examples, the PSE system is able to detect which network port (e.g., port number) is coupled to a PD, and to assign a priority based on a predetermined prioritization scheme for different network ports. Additionally or alternatively, a computer with a graphic user interface (GUI) is coupled to the PSE system, and enables a user to review and adjust a PD or network port prioritization scheme. With the disclosed PSE system, port power management operations are performed quickly compared to previous port power management operations, which help ensures that a maximum number of PDs are powered without PSE system overload and reboot. To provide a better understanding, various PSE system options, sensing circuit options, and network port management options are described using the figures as follows.

Figure 1:
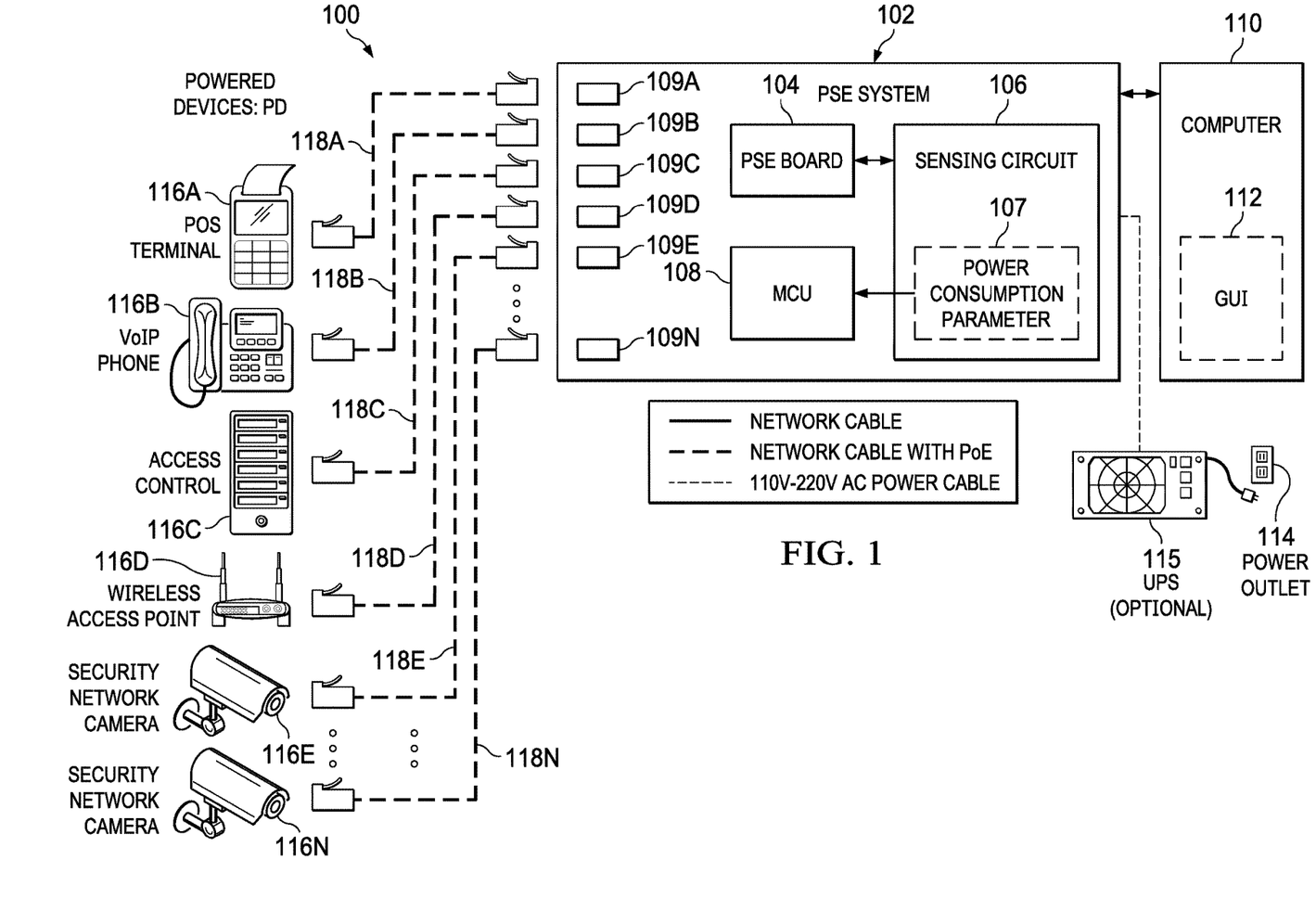
FIG. 1 is a block diagram showing a system in accordance with various examples.

FIG. 1 is a block diagram showing a system 100 in accordance with various examples. As shown, the system 100 comprises a PSE system 102 coupled to a power outlet 114. As an option, an uninterruptible power supply (UPS) device 115 is positioned between the PSE system 102 and the power outlet 114. The PSE system 102 selectively provides power to a plurality of PDs 116A-116N via respective network cables 118A-118N and network ports 109A-109N. In some examples, a PSE board 104 includes or is coupled to the network ports 109A-109N and is used to distribute power to the network ports 109A-109N. In some examples, the PSE board 104 operates to provide power to as many of the PDs 116A-116N as possible subject to a predetermined power consumption constraint of the PSE system 102.

In the example of FIG. 1, the PSE system 102 includes the PSE board 104 along with a sensing circuit 106 and a controller (MCU) 108. In operation, the PSE board 104 uses power available from the power outlet 114 and/or UPS device 115 to provide power to the network ports 109A-109N subject to a predetermined power consumption constraint. While the PSE board 104 provides power to the PDs 116A-116N via the network ports 109A-109N and the network cables 118A-108N, the sensing circuit 106 determines a power consumption parameter 107 for some or all of the network ports 109A-109N (e.g., all of the active network ports). The power consumption parameter 107 is provided by the sensing circuit 106 to the controller 108, which performs power state updates for one or more of the network ports 109A-109N based on the power consumption parameter 107.

In different examples, the sensing circuit 106 and/or the power consumption parameter 107 provided by the sensing circuit 106 varies. In some examples, the power consumption parameter 107 provided by the sensing circuit 106 is an analog current value related to all active ports of the network ports 109A-109N of the PSE system 102. In other examples, the power consumption parameter 107 provided by the sensing circuit 106 is a digital current value related to all active ports of the network ports 109A-109N of the PSE system 102. In other examples, the power consumption parameter 107 provided by the sensing circuit 106 is a digital power consumption value related to all active ports of the network ports 109A-109N of the PSE system 102. In other examples, the power consumption parameter 107 provided by the sensing circuit 106 is an over-current alert signal related to all active ports of the network ports 109A-109N of the PSE system 102. In response to receiving a power consumption parameter 107, the controller 108 for the PSE system 102 performs power state updates (e.g., on-to-off or off-to-on) for at least one of the plurality of network ports 109A-109N.

In some examples, the controller 108 uses the power consumption parameter 107 provided by the sensing circuit 106 directly to perform power state updates. In other examples, the controller 108 uses the power consumption parameter 107 to calculate a power consumption for all active ports of the network ports 109A-109N of the PSE system 102. Thereafter, the controller 108 performs power state updates for one or more of the network ports 109A-109N of the PSE system 102 based on the calculated power consumption.

In some examples, the controller 108 performs power state updates of the PSE system 102 based on a PD or network port prioritization scheme. In one example, security devices (e.g., security cameras) powered by the PSE system 102 are assigned a higher priority than non-security devices. In some examples, the PSE system 102 is able to detect a PD type and assign a priority based on a predetermined prioritization scheme for different PD types. In some examples, the PSE system 102 is able to detect which of the network ports 109A-109N (e.g., port number) is coupled to a PD, and to assign a priority based on a predetermined prioritization scheme for different ports of the network ports 109A-109N. Additionally or alternatively, a computer 110 with a graphic user interface (GUI) 112 is coupled to the PSE system 102, and enables a user to review and adjust a PD or network port prioritization scheme. In different examples, the GUI 112 also displays status information or alerts related to the PDs 116A-116N or the PSE system 102. In some examples, the PSE system 102 includes a host processor (CPU) to monitor and modify system and port configurations (e.g., to monitor power status, to monitor port on/off status, to monitor faults, to configure port priority, to configure port power limits, to configure system power budget, etc.). In such case, the host CPU interacts with or is used instead of the computer 110.

Figure 2:
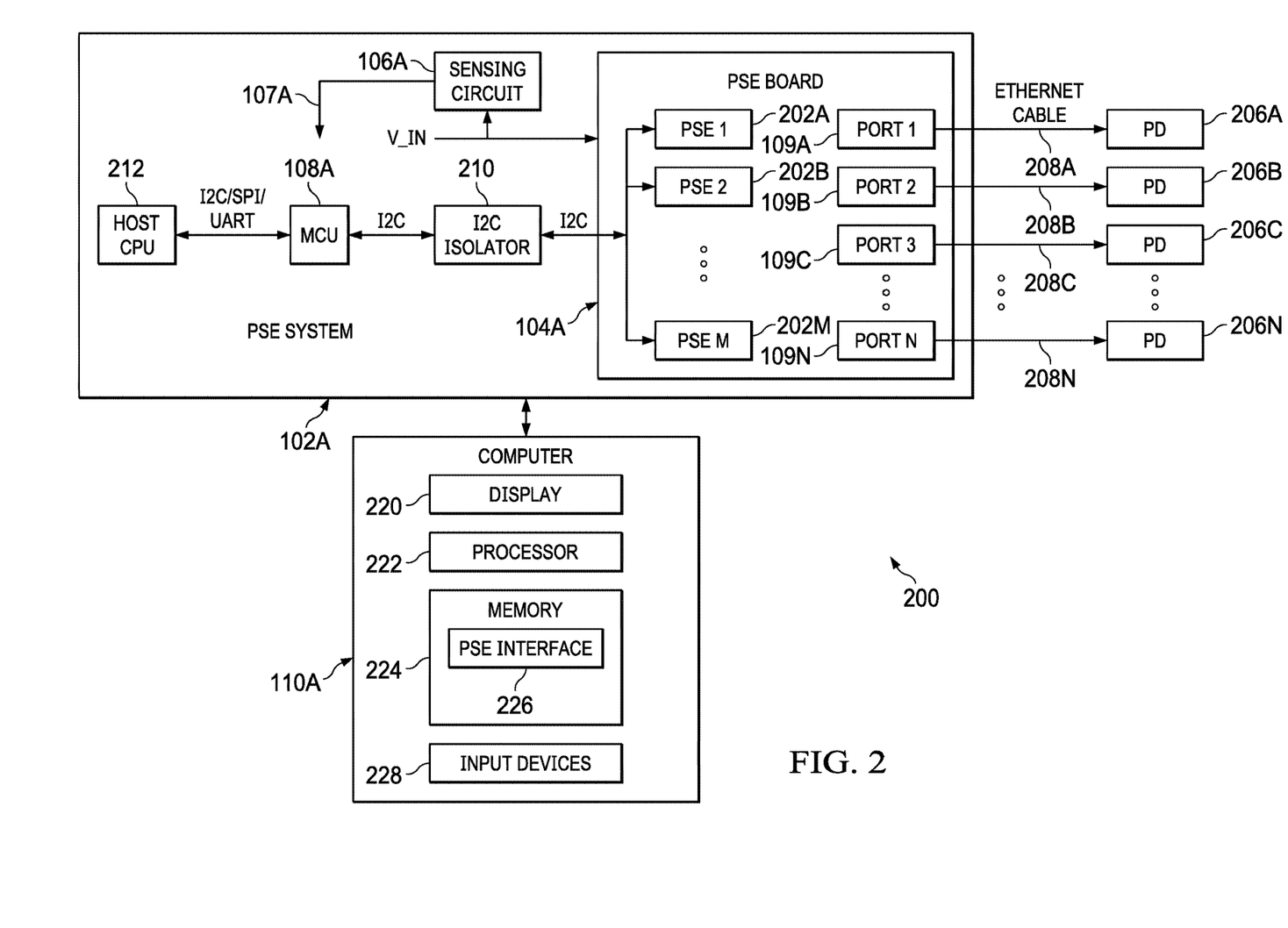
FIG. 2 is a block diagram showing a power sourcing equipment (PSE) system scenario in accordance with various examples.

FIG. 2 is a block diagram showing a PSE system scenario 200 in accordance with various examples. In scenario 200, a PSE system 102A is represented, where the PSE system 102A of FIG. 2 is an example of the PSE system 102 of FIG. 1. As shown, the PSE system 102A includes a PSE board 104A (an example of the PSE board 104 of FIG. 1) with the network ports 109A-109N and PSE modules 202A-202M. The PSE modules 202A-202M comprise analog and/or digital components to selectively distribute power to each of the network ports 109A-109N. In some examples, the PSE modules 202A-202M also serve as a communication link for data conveyed to/from a plurality of PDs 206A-206N, where the PDs 206A-206N of FIG. 2 correspond to one or more PD types such as the PD types discussed with regard to the PDs 116A-116N in FIG. 1. In other words, in some examples, the PSE modules 202A-202M correspond to power over network management circuits.

As shown, the scenario 200 also shows a computer 110A coupled to the PSE system 102A. The computer 110A of FIG. 2 is an example of the computer 110 of FIG. 1. In some examples, the computer 110A includes a display 220, a processor 222, a memory 224 with PSE interface instructions 226, and input devices 228. Examples of the input devices 228 include a keyboard, a mouse, a touchscreen, etc. When executed by the processor 222, the PSE interface instructions 226 cause the computer 110A to provide a GUI (e.g., the GUI 112) using the display 220 and the input devices 228. An example GUI displays PSE system information and options such as PD or network port prioritization options. Also, the GUI enables a user to review, select, or update the options using the input devices 228.

In some examples, the PSE system 102A couples to a power outlet or UPS device as described for the PSE system 102 of FIG. 1. In operation, the PSE system 102A selectively provides power to the plurality of PDs 206A-206N via respective network cables 208A-208N and the network ports 109A-109N. In some examples, the PSE board 104A operates to provide power to as many of the PDs 206A-206N as possible subject to a predetermined power consumption constraint of the PSE system 102A.

In the scenario 200 of FIG. 2, the PSE system 102A includes the PSE board 104A along with a sensing circuit 106A (an example of the sensing circuit 106 of FIG. 1), a controller (MCU) 108A (an example of the controller 108 of FIG. 1), a communication interface 210 (e.g., an I2C interface with an I2C isolator between the MCU 108A and the PSE modules 202A-202M), and a host processor (CPU) 212.

In operation, the PSE board 104A uses power available from a power outlet or a UPS device to provide power to the network ports 109A-109N subject to a predetermined power consumption constraint. While the PSE board 104A provides power to the PDs 206A-206N via the network ports 109A-109N and the network cables 208A-208N, the sensing circuit 106A determines a power consumption parameter 107A for some or all of the network ports 109A-109N (e.g., all of the active network ports). The power consumption parameter 107A is provided by the sensing circuit 106A to the controller 108A, which performs power state updates for one or more of the network ports 109A-109N based on the power consumption parameter 107A.

In the example of FIG. 2, the controller 108A performs power state updates for the network ports 109A-109N by sending control signals or messages to the PSE modules 202A via the communication interface 210. For example, in response to the power consumption parameter 107A being greater than a threshold or otherwise indicating that the power consumption of the PSE system 102A is greater than the predetermined power consumption constraint, the controller 108A sends a control signal to one or more of the PSE modules 202A-202M to turn off power to one or more of the network ports 109A-109N. Also, in response to the power consumption parameter 107A being less than a threshold or otherwise indicating that the power consumption of the PSE system 102A is less than a the predetermine power consumption constrain by a threshold amount, the controller 108A sends a control signal to one or more of the PSE modules 202A-202M to turn on power to one or more of the network ports 109A-109N.

In different examples, the sensing circuit 106A and/or the power consumption parameter 107A provided by the sensing circuit 106 varies. In some examples, the power consumption parameter 107A provided by the sensing circuit 106A is an analog current value related to all active ports of the network ports 109A-109N of the PSE system 102A. In other examples, the power consumption parameter 107A provided by the sensing circuit 106A is a digital current value related to all active ports of the network ports 109A-109N of the PSE system 102A. In other examples, the power consumption parameter 107A provided by the sensing circuit 106A is a digital power consumption value related to all active ports of the network ports 109A-109N of the PSE system 102A. In other examples, the power consumption parameter 107A provided by the sensing circuit 106A is an over-current alert signal related to all active ports of the network ports 109A-109N of the PSE system 102A. In response to receiving a power consumption parameter 107A, the controller 108A for the PSE system 102A performs power state updates (e.g., on-to-off or off-to-on) for at least one of the plurality of network ports 109A-109N.

In some examples, the controller 108A uses the power consumption parameter 107A provided by the sensing circuit 106A directly to perform power state updates. In other examples, the controller 108A uses the power consumption parameter 107A to calculate a power consumption for all active ports of the network ports 109A-109N of the PSE system 102A. Thereafter, the controller 108A performs power state updates for one or more of the network ports 109A-109N of the PSE system 102A based on the calculated power consumption.

In some examples, the controller 108A performs power state updates of the PSE system 102A based on a PD or network port prioritization scheme. In one example, security devices (e.g., security cameras) powered by the PSE system 102A are assigned a higher priority than non-security devices. In some examples, the PSE system 102A is able to detect a PD type and assign a priority based on a predetermined prioritization scheme for different PD types. In some examples, the PSE system 102A is able to detect which of the network ports 109A-109N (e.g., port number) is coupled to a PD, and to assign a priority based on a predetermined prioritization scheme for different ports of the network ports 109A-109N. Additionally or alternatively, the computer 110A enables a user to review and adjust a PD or network port prioritization scheme. In some examples, the PSE interface instructions 226, when executed by the processor 222, enable a user to review, select, or update PSE options such as a PD or network port prioritization scheme. In different examples, the computer 110A also displays status information or alerts related to the PDs 206A-206N or the PSE system 102A.

In different examples, the number of network ports 109A-109N for the PSE system 102A (e.g., 16 ports, 24 ports, 48 ports, 96 ports) and the power supply for the PSE system 102A is not able to supply full power for all ports. For example, in a 48 port PSE system, each connected PD can consume as much as 30 W. So the total PSE system can draw as high as 1440 W of power. If the power supply for the PSE system 102A cannot provide 1440 W, port power management becomes necessary to manage and distribute the power in an efficient way. In some examples, the PSE system 102A performs port power management based on the sensing circuit 106A determining the power consumption parameter 107A in real-time. In contrast to the PSE system 102, some other PSE systems are configured to read each port's current and voltage, calculate the power consumption for each port, and then sum power consumption values of all ports (or all active ports) together. The latency of reading current and voltage values for each port, calculating power consumption for each port, and summing the power consumption values of all ports (or all active ports) is undesirably high (e.g., a latency estimated to be up to 110.6 ms for a 48 port PSE system). This latency could trigger the main power supply to shut down if there is a high load step change that causes total output power higher than the input power. For some scenarios, it is not acceptable to have a PSE system reboot. For example, if a PSE system 102A is powering security cameras, reboots need to be avoided to prevent loss of security camera data during PSE system reboots.

By using the sensing circuit 106A to provide the power consumption parameter 107A for all network ports 109A-109N (or all active network ports), the latency of power state adjustments is reduced, which helps reduce or eliminate occurrences of reboots of the PSE system 102A. In some examples, the controller 108A continuously monitors the power consumption parameter 107A from the sensing circuit 106A. When an overload condition is detected based on the power consumption parameter 107A, the controller 108A turns off lower priority ports of the network ports 109A-109N to maintain input power consumption within the predetermined power consumption constraint to avoid occurrences of PSE system reboot. When the overload condition is removed, the controller 108A incrementally powers up lower priority ports of the network ports 109A-109N as the power budget allows.

FIG. 3A-3E are schematic diagrams showing sensing circuit scenarios 300A-300E in accordance with various examples. In the scenario 300A of FIG. 3A, a sensing circuit 106B is used to provide a power consumption parameter 107B to a controller 108B. In the scenario 300A, the sensing circuit 106B, the power consumption parameter 107B, and the controller 108B are examples of the sensing circuit 106, the power consumption parameter 107, and the controller 108 of FIG. 1, or the sensing circuit 106A, the power consumption parameter 107A, and the controller 108A of FIG. 2.

Figure 3A:
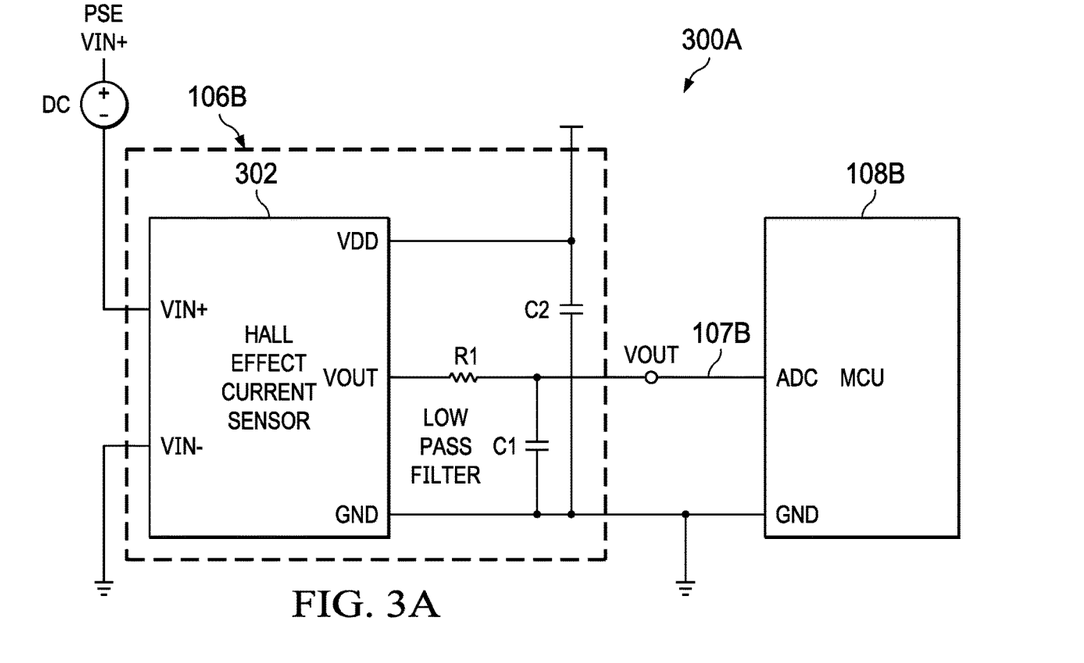
FIG. 3A-3E are schematic diagrams showing sensing circuit scenarios in accordance with various examples.

As shown, the sensing circuit 106B comprises a Hall effect current sensor 302. In some examples, the Hall effect current sensor 302 includes a first input node (VIN+), a second input node (VIN−), a power supply (VDD) node, an output voltage (VOUT) node, and a ground (GND) node. In the example scenario 300A, the VIN+ node of the Hall effect current sensor 302 couples to a PSE system power supply (PSE Vin+). Meanwhile, the VIN− node of the Hall effect current sensor 302 couples to a ground node. In operation, the Hall effect current sensor 302 provides a value for VOUT that is a function of the PSE system power supply current that passes through the VIN+ and VIN− nodes of the Hall effect current sensor 302.

In the scenario 300A, VOUT of the Hall effect current sensor 302 is conveyed to the controller 108B via a resistor-capacitor (RC) circuit with R1 and C1, where the output of the RC circuit is the power consumption parameter 107B. More specifically, the controller 108B receives the power consumption parameter 107B at an ADC node of the controller 108B. The controller 108B is configured to use the power consumption parameter 107B to perform power state updates for network ports of a PSE system as described herein. In some examples, the controller 108B compares the power consumption parameter 107B to a threshold to perform power state updates. For example, if the power consumption parameter 107B is greater than a threshold, the controller 108B changes the power state of one or more network ports from on to off. In contrast, if the power consumption parameter 107B is less than the threshold, the controller 108B changes the power state of one or more network ports from off to on.

In other examples, the controller 108B uses the power consumption parameter 107B to calculate a power consumption for all active network ports of a PSE system. Thereafter, the controller 108B compares the power consumption parameter 107B to a threshold to perform power state updates. For example, if the calculated power consumption is greater than a threshold, the controller 108B changes the power state of one or more network ports from off to on. In contrast, if the calculated power consumption is less than the threshold, the controller 108B changes the power state of one or more network ports from on to off. With the Hall effect current sensor 302, no sense resistor is used, which reduces power losses due to the sensing circuit 106B. Also, for scenario 300A, isolation components between the Hall effect current sensor 302 and the controller 108B are avoided. Also, ADC circuitry is used, where the ADC circuitry is either part of the controller 108B as shown, or is between the Hall effect current sensor 302 and the controller 108B.

Figure 3B:
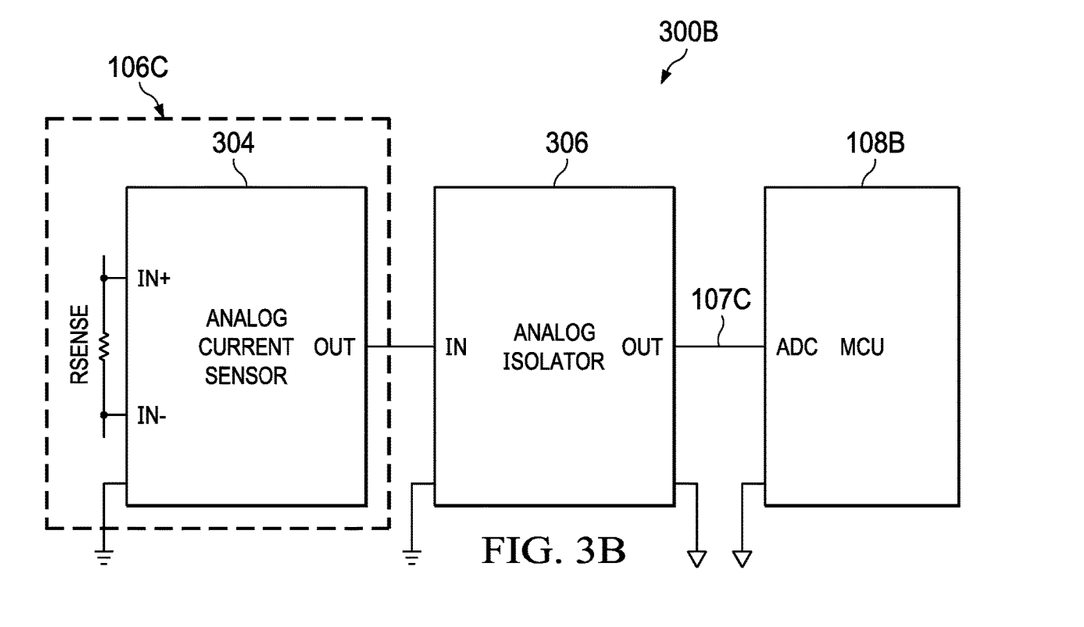

In the scenario 300B of FIG. 3B, a sensing circuit 106C is used to provide a power consumption parameter 107C to a controller 108B. In the scenario 300B, the sensing circuit 106C, the power consumption parameter 107C, and the controller 108B are examples of the sensing circuit 106, the power consumption parameter 107, and the controller 108 of FIG. 1, or the sensing circuit 106A, the power consumption parameter 107A, and the controller 108A of FIG. 2.

As shown, the sensing circuit 106C comprises a sense resistor (Rsense) and an analog current sensor 304. To measure the current for all network ports of a PSE system as described herein, Rsense is positioned along a power supply line for a PSE board (e.g., the PSE board 104 of FIG. 1, or the PSE board 104A of FIG. 2). In some examples, the analog current sensor 304 includes a first input node (IN+), a second input node (IN−), an output voltage (OUT) node. As shown, the IN+ node of the analog current sensor 304 couples to a first side of Rsense, while the IN− node of the analog current sensor 304 couples to a second side of Rsense.

In the scenario 300B, the output of the analog current sensor 304 is conveyed to the controller 108B via an analog isolator 306, where the output of the analog isolator 306 is the power consumption parameter 107C. The analog isolator 306 is used, for example, when the power supply voltage levels and/or grounds for the analog current sensor 304 and the controller 108B are different. In some examples, the analog isolator 306 is an opto-coupler device. As shown, the controller 108B receives the power consumption parameter 107C at an ADC node of the controller 108B. The controller 108B is configured to use the power consumption parameter 107C to perform power state updates for network ports of a PSE system as described herein. In some examples, the controller 108B compares the power consumption parameter 107C to a threshold to perform power state updates. For example, if the power consumption parameter 107C is greater than a threshold, the controller 108B changes the power state of one or more network ports from on to off. In contrast, if the power consumption parameter 107C is less than the threshold, the controller 108B changes the power state of one or more network ports from off to on.

In other examples, the controller 108B uses the power consumption parameter 107C to calculate a power consumption for all active network ports of a PSE system. Thereafter, the controller 108B compares the power consumption parameter 107C to a threshold to perform power state updates. For example, if the calculated power consumption is greater than a threshold, the controller 108B changes the power state of one or more network ports from off to on. In contrast, if the calculated power consumption is less than the threshold, the controller 108B changes the power state of one or more network ports from on to off. With the analog current sensor 304, Rsense is used, which results in some power loss due to the sensing circuit 106C. Also, for scenario 300B, isolation components (e.g., an opto-coupler) between the analog current sensor 304 and the controller 108B are used. Also, ADC circuitry is used, where the ADC circuitry is either part of the controller 108B as shown, or is between the analog current sensor 304 and the controller 108B.

Figure 3C:
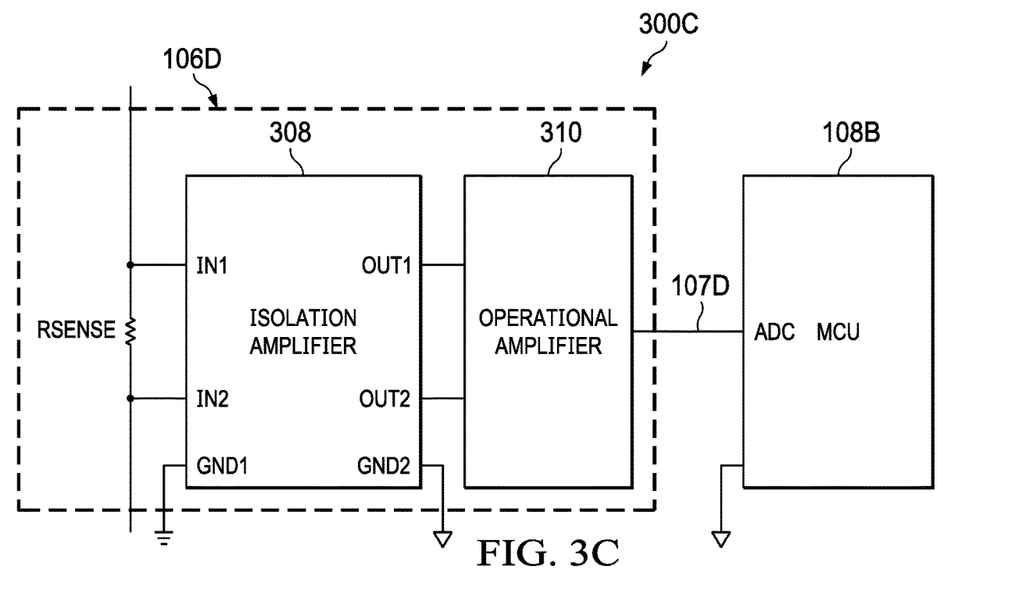

In the scenario 300C of FIG. 3C, a sensing circuit 106D is used to provide a power consumption parameter 107D to a controller 108B. In the scenario 300C, the sensing circuit 106D, the power consumption parameter 107D, and the controller 108B are examples of the sensing circuit 106, the power consumption parameter 107, and the controller 108 of FIG. 1, or the sensing circuit 106A, the power consumption parameter 107A, and the controller 108A of FIG. 2.

As shown, the sensing circuit 106D comprises a sense resistor (Rsense) and an isolation amplifier 308. To measure the current for all network ports of a PSE system as described herein, Rsense is positioned along a power supply line for a PSE board (e.g., the PSE board 104 of FIG. 1, or the PSE board 104A of FIG. 2). In some examples, the isolation amplifier 308 includes two input nodes (IN1 and IN2), two output nodes (OUT1 and OUT2), and two ground nodes (GND1 and GND2). As shown, the IN1 node of the isolation amplifier 308 couples to a first side of Rsense, while the IN2 node of the isolation amplifier 308 couples to a second side of Rsense.

In the scenario 300C, the output of the isolation amplifier 308 is conveyed to the operational amplifier 310, where the output of the operational amplifier 310 is the power consumption parameter 107D. As shown, the controller 108B receives the power consumption parameter 107D at an ADC node of the controller 108B. The controller 108B is configured to use the power consumption parameter 107D to perform power state updates for network ports of a PSE system as described herein. In some examples, the controller 108B compares the power consumption parameter 107D to a threshold to perform power state updates. For example, if the power consumption parameter 107D is greater than a threshold, the controller 108B changes the power state of one or more network ports from on to off. In contrast, if the power consumption parameter 107D is less than the threshold, the controller 108B changes the power state of one or more network ports from off to on.

In other examples, the controller 108B uses the power consumption parameter 107D to calculate a power consumption for all active network ports of a PSE system. Thereafter, the controller 108B compares the power consumption parameter 107D to a threshold to perform power state updates. For example, if the calculated power consumption is greater than a threshold, the controller 1086 changes the power state of one or more network ports from off to on. In contrast, if the calculated power consumption is less than the threshold, the controller 108B changes the power state of one or more network ports from on to off. With the isolation amplifier 308 and operational amplifier 310, Rsense is used, which results in some power loss due to the sensing circuit 106D. Also, for scenario 300C, isolation components (e.g., an opto-coupler) between the sensing circuit 106D and the controller 108B are avoided. Also, ADC circuitry is used, where the ADC circuitry is either part of the controller 1086 as shown, or is between the sensing circuit 106D and the controller 108B.

Figure 3D:
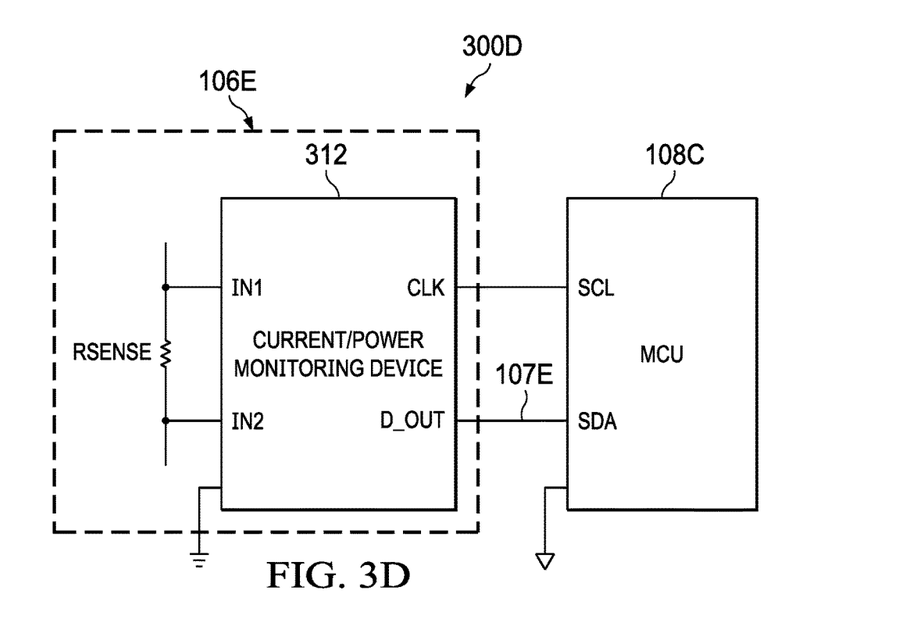

In the scenario 300D of FIG. 3D, a sensing circuit 106E is used to provide a power consumption parameter 107E to a controller 108C. In the scenario 300D, the sensing circuit 106E, the power consumption parameter 107E, and the controller 108C are examples of the sensing circuit 106, the power consumption parameter 107, and the controller 108 of FIG. 1, or the sensing circuit 106A, the power consumption parameter 107A, and the controller 108A of FIG. 2.

As shown, the sensing circuit 106E comprises a sense resistor (Rsense) and a current or power monitoring device 312. To measure the current for all network ports of a PSE system as described herein, Rsense is positioned along a power supply line for a PSE board (e.g., the PSE board 104 of FIG. 1, or the PSE board 104A of FIG. 2). In some examples, the current or power monitoring device 312 includes two input nodes (IN1 and IN2), a clock node (CLK) and data output node (D_OUT). As shown, the IN1 node of the current or power monitoring device 312 couples to a first side of Rsense, while the IN2 node of the current or power monitoring device 312 couples to a second side of Rsense.

In the scenario 300D, the CLK signal from the current or power monitoring device 312 is conveyed to clock node (SCL) of the controller 108C. Also, the data output from the D_OUT node of the current or power monitoring device 312 is conveyed to a clocked data input node (SDA) of the controller 108C, and is the power consumption parameter 107E for scenario 300D. The controller 108C is configured to use the power consumption parameter 107E to perform power state updates for network ports of a PSE system as described herein. In some examples, the controller 108C compares the power consumption parameter 107E to a threshold to perform power state updates. For example, if the power consumption parameter 107E is greater than a threshold, the controller 108C changes the power state of one or more network ports from on to off. In contrast, if the power consumption parameter 107E is less than the threshold, the controller 108C changes the power state of one or more network ports from off to on.

In other examples, the controller 108C uses the power consumption parameter 107E to calculate a power consumption for all active network ports of a PSE system. Thereafter, the controller 108C compares the power consumption parameter 107E to a threshold to perform power state updates. For example, if the calculated power consumption is greater than a threshold, the controller 108C changes the power state of one or more network ports from off to on. In contrast, if the calculated power consumption is less than the threshold, the controller 108C changes the power state of one or more network ports from on to off. With the current or power monitoring device 312, Rsense is used, which results in some power loss due to the sensing circuit 106E. Also, for scenario 300D, isolation components (e.g., an opto-coupler) between the sensing circuit 106E and the controller 108C are avoided. Also, while ADC circuitry is avoided, the clocked data input node (SDA) of the controller 108C is shared, which adds a little latency.

Figure 3E:
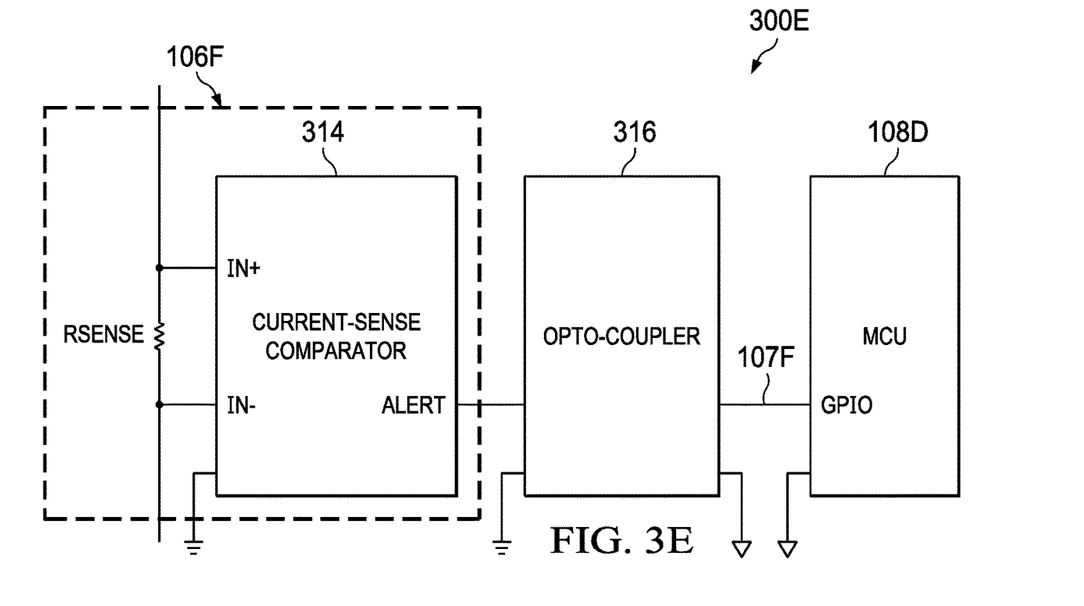

In the scenario 300E of FIG. 3E, a sensing circuit 106F is used to provide a power consumption parameter 107F to a controller 108D. In the scenario 300E, the sensing circuit 106F, the power consumption parameter 107F, and the controller 108D are examples of the sensing circuit 106, the power consumption parameter 107, and the controller 108 of FIG. 1, or the sensing circuit 106A, the power consumption parameter 107A, and the controller 108A of FIG. 2.

As shown, the sensing circuit 106F comprises a sense resistor (Rsense) and a current-sense comparator 314. To measure the current for all network ports of a PSE system as described herein, Rsense is positioned along a power supply line for a PSE board (e.g., the PSE board 104 of FIG. 1, or the PSE board 104A of FIG. 2). In some examples, the current-sense comparator 314 includes two input nodes (IN+ and IN−), and an output alert node (ALERT). As shown, the IN+ node of the current-sense comparator 314 couples to a first side of Rsense, while the IN− node of the current-sense comparator 314 couples to a second side of Rsense.

In the scenario 300E, the alert signal from the current-sense comparator 314 is conveyed to the controller 108D via an opto-coupler 316, wherein the output of the opto-coupler 316 is the power consumption parameter 107F for scenario 300E. The controller 108D is configured to receive the power consumption parameter 107F via a programmable input/output (GPIO) node and to perform power state updates for network ports of a PSE system as described herein. In some examples, the controller 108D uses the power consumption parameter 107F to perform power state updates. For example, when the power consumption parameter 107E is received, the controller 108C changes the power state of one or more network ports from on to off. In contrast, if the power consumption parameter 107E is not received for more than a threshold amount of time, the controller 108D changes the power state of one or more network ports from off to on.

With the current-sense comparator 314, Rsense is used, which results in some power loss due to the sensing circuit 106F. Also, for scenario 300E, isolation components (e.g., an opto-coupler) between the sensing circuit 106F and the controller 108D are used. Also, ADC circuitry and calculations are avoided (the power consumption parameter 107E is a simple alert rather than current value or power consumption value).

Figure 4:
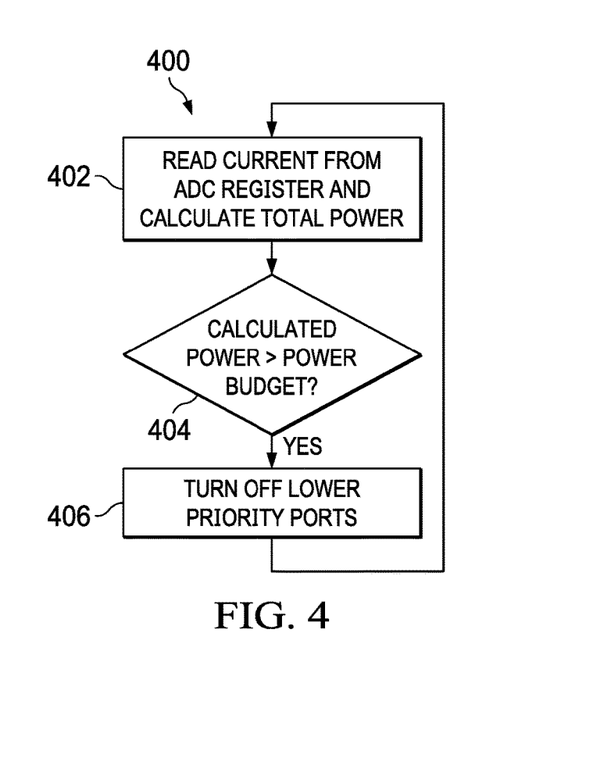
FIGS. 4-6 are flowcharts showing PSE system port management methods in accordance with various examples.
Figure 5:
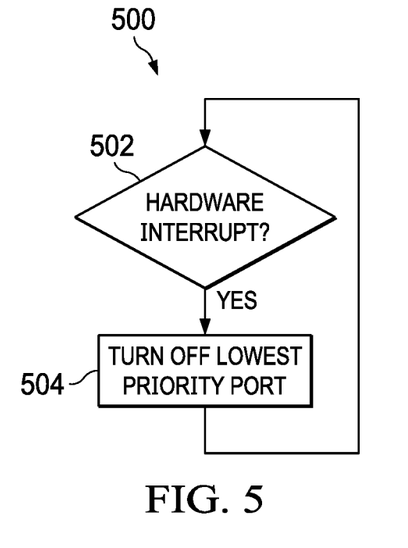
Figure 6:
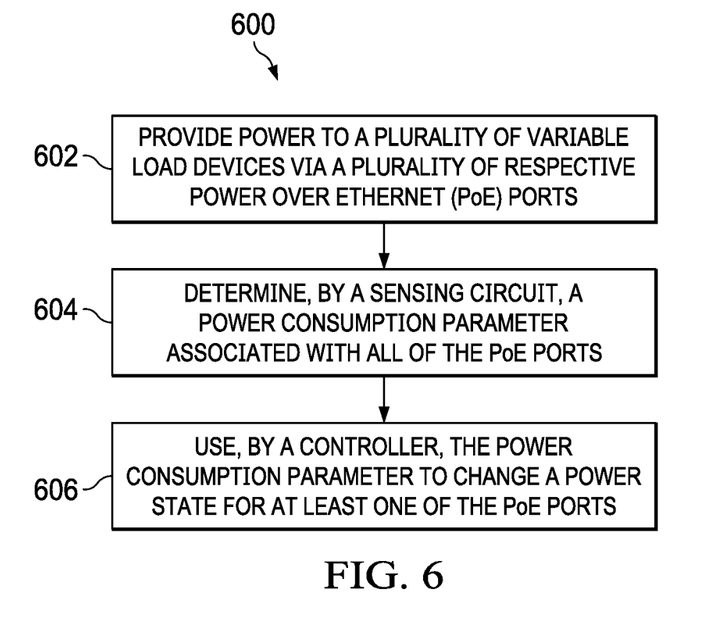

FIGS. 4-6 are flowcharts showing PSE system port management methods in accordance with various examples. In the method 400 of FIG. 4, a current value is read from an ADC register and a total power value is calculated at block 402. If the total power value is greater than a power budget (decision block 404), one or more of the lowest priority ports are turned off at block 406. The method 400 is performed, for example, with the sensing circuit scenarios 300A-300C of FIGS. 3A-3C. In such case, the power consumption parameters 107B-107D correspond to current values that are digitized and stored in an ADC register of the controller 108B.

As an example, assume the power supply for a PSE system has a max power of 500 W and that load step change increases are 100 W each. Also, assume, the total number of ports is 24, where ports 1-8 are high priority, ports 9-16 are medium priority, and ports 17-24 are low priority. Also, assume each port consumes up to 30 W, and the power supply hold up time is 70 ms. For this example, when the load step change happens, the total consumed power jumps from 490 W to 600 W. With the method 400, a controller (e.g., the controller 108B) is able to calculate the actual consumed power in less than 1 ms. Subsequently, a controller (e.g., controller 108B) performs power state update operations as described herein.

In the method 500 of FIG. 5, if a hardware interrupt is detected (decision block 502), one or more of the lowest priority ports are turned off at block 504. The method 500 is performed, for example, with the sensing circuit scenarios 300E of FIG. 3E. In such case, the power consumption parameter 107F of FIG. 3E corresponds to an alert signal that results in a hardware interrupt of the controller 108D. In some examples, with the method 500, a controller (e.g., the controller 108D) receives an alert signal through hardware and performs power state update operations by turning off ports from lowest priority one by one until the alert signal is de-asserted. After ports are powered off, detection and classification is restarted, where the powered off ports wait to turn on whenever power is available.

In the method 600 of FIG. 600, power is provided to a plurality of variable load devices (e.g., PDs 116A-116N in FIG. 1, or PDs 206A-206N in FIG. 2) via a plurality of respective Power over Ethernet (PoE) ports at block 602. At block 604, a power consumption parameter associated with all of the PoE ports is determined by a sensing circuit (e.g., the sensing circuit 106 of FIG. 1, the sensing circuit 106A of FIG. 2, the sensing circuits 106B-106F of FIGS. 3A-3E).

At block 606, a controller (e.g., the controller 108 of FIG. 1, the controller 108A of FIG. 2, the controller 108B of FIGS. 3A-3C, the controller 108C of FIG. 3D, or the controller 108D of FIG. 3E) uses the power consumption parameter to change a power state for at least one of the PoE ports. The method 600 is applicable to all of the sensing circuit scenarios 300A-300E of FIGS. 3A-3E to manage ongoing port power control operations based on a predetermined power consumption constraint or budget.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power sourcing system comprising:
a power source input;
a first network port having a first power input and being adapted to be coupled to a first powered device having a first power consumption priority;
a first module having a first source input coupled to the power source input, having a first module output coupled to the first power input, and having a first power control input;
a second network port having a second power input and being adapted to be coupled to a second powered device having a second power consumption priority;
a second module having a second source input coupled to the power source input, having a second module output coupled to the second power input, and having a second power control input;
a sensing circuit having a sensing input coupled to the power source input and having a power consumption output providing a power consumption parameter; and
controller circuitry having a power consumption input coupled to the power consumption output and having control outputs coupled to the first power control input and the second power control input, in which the controller circuitry is a microcontroller circuit and including an I2C isolator circuit coupling the power control signals to the first and second modules.

2. The power sourcing system of claim 1, in which the controller is configured to change the power state for one of the first and second network ports based on a powered device or network port prioritization scheme.

3. The power sourcing system of claim 2, in which the powered devices include one security device and one non-security device, and the prioritization scheme prioritizes the one security device over the one non-security device.

4. The power sourcing system of claim 3, in which the one security device includes a security camera.

5. The power sourcing system of claim 2, including a computer or host processor adapted to display system configuration options to a user and to update the prioritization scheme based on user input.

6. The power sourcing system of claim 1, in which the sensing circuit includes a Hall effect current sensor configured to output the power consumption parameter to an analog-to-digital converter (ADC) input of the controller.

7. The power sourcing system of claim 6, in which the sensing circuit includes a low-pass filter between an output of the Hall effect current sensor and the ADC input of the controller.

8. The power sourcing system of claim 1, in which the sensing circuit includes an analog current sensor configured to output the power consumption parameter to an analog-to-digital converter (ADC) input of the controller via an analog isolator.

9. The power sourcing system of claim 1, in which the sensing circuit includes an isolation amplifier and an operational amplifier configured to output the power consumption parameter to an analog-to-digital converter (ADC) input of the controller.

10. The power sourcing system of claim 1, in which the sensing circuit includes a current or power monitoring device configured to output the power consumption parameter to a clocked data input of the controller.

11. The power sourcing system of claim 1, in which the sensing circuit includes a current-sense comparator device configured to output the power consumption parameter to a programmable input/output of the controller.

12. The power sourcing system of claim 11 in which the sensing circuit includes an opto-coupler between an output of the current-sense comparator device and the programmable input/output of the controller.

13. The power sourcing system of claim 1 including a first Ethernet cable coupling the first network port to the first powered device and a second Ethernet cable coupling the second network port to the second powered device.

14. The power sourcing system of claim 1 including a powered device coupled to the first network port.

15. The power sourcing system of claim 1 including a power source equipment board carrying the first network port and the first module.

* * * * *